(12) United States Patent
Chang et al.

(10) Patent No.: US 7,181,611 B2
(45) Date of Patent: Feb. 20, 2007

(54) POWER MANAGEMENT BLOCK FOR USE IN A NON-VOLATILE MEMORY SYSTEM

(75) Inventors: Robert C. Chang, Danville, CA (US); Bahman Qawami, San Jose, CA (US); Farshid Sabet-Sharghi, San Jose, CA (US); Sergey Yudin, Fremont, CA (US)

(73) Assignee: SanDisk Corporation, Milpitas, CA (US)

( * ) Notice: Subject to any disclaimer, the term of this patent is extended or adjusted under 35 U.S.C. 154(b) by 492 days.

(21) Appl. No.: 10/685,624

(22) Filed: Oct. 14, 2003

(65) Prior Publication Data
US 2004/0083405 A1    Apr. 29, 2004

Related U.S. Application Data
(60) Provisional application No. 60/422,166, filed on Oct. 28, 2002.

(51) Int. Cl.
G06F 9/00 (2006.01)
G06F 9/24 (2006.01)
G06F 15/177 (2006.01)

(52) U.S. Cl. .............................. 713/100; 713/1; 713/2
(58) Field of Classification Search .................... None
See application file for complete search history.

(56) References Cited

U.S. PATENT DOCUMENTS

| | | | |
|---|---|---|---|
| 5,222,109 A | 6/1993 | Pricer | 377/24.1 |
| 5,297,148 A | 3/1994 | Harari et al. | 371/10.2 |
| 5,388,083 A | 2/1995 | Assar et al. | 365/218 |
| 5,438,573 A | 8/1995 | Mangan et al. | 371/10.3 |
| 5,557,777 A * | 9/1996 | Culbert | 713/2 |
| 5,568,439 A | 10/1996 | Harari | 365/218 |
| 5,598,370 A | 1/1997 | Niijima et al. | 365/185.33 |
| 5,835,935 A | 11/1998 | Estakhri et al. | 711/103 |
| 5,845,313 A | 12/1998 | Estakhri et al. | 711/103 |
| 5,860,082 A | 1/1999 | Smith et al. | 711/103 |
| 5,907,856 A | 5/1999 | Estakhri et al. | 711/103 |

(Continued)

FOREIGN PATENT DOCUMENTS

JP    62-283496    12/1987

(Continued)

OTHER PUBLICATIONS

Kim, Jesung et al., "A Space-Efficient Flash Translation Layer for Compactflash Systems", IEEE Transactions on Consumer Electronics, vol. 48, No. 2, May 2002.

*Primary Examiner*—Thuan N. Du
*Assistant Examiner*—Stefan Stoynov
(74) *Attorney, Agent, or Firm*—Anderson, Levine & Lintel

(57) ABSTRACT

Methods and apparatus for enabling a power up process of a non-volatile memory to occur efficiently are disclosed. According to one aspect of the present invention, a method for utilizing a memory system that has a non-volatile memory with at least one reserved memory area includes providing power to the memory system, initializing the non-volatile memory, and writing a first signature into the reserved memory area. The first signature is arranged to indicate that the memory system was successfully initialized. In one embodiment, the method also includes executing a power down process on the memory system, and writing a second signature into the reserved memory area which indicates that the power down process has been executed.

25 Claims, 9 Drawing Sheets

U.S. PATENT DOCUMENTS

| | | | |
|---|---|---|---|
| 5,924,113 A | 7/1999 | Estakhri et al. | 711/103 |
| 6,016,275 A | 1/2000 | Han | 365/185.29 |
| 6,081,447 A | 6/2000 | Lofgren et al. | 365/185.02 |
| 6,115,785 A | 9/2000 | Estakhri et al. | 711/103 |
| 6,125,435 A | 9/2000 | Estakhri et al. | 711/201 |
| 6,216,226 B1 | 4/2001 | Agha et al. | |
| 6,230,233 B1 | 5/2001 | Lofgren et al. | 711/103 |
| 6,260,156 B1 | 7/2001 | Garvin et al. | 714/8 |
| 6,426,893 B1 | 7/2002 | Conley et al. | 365/185.11 |
| 7,028,172 B2 * | 4/2006 | Levidow et al. | 713/1 |

FOREIGN PATENT DOCUMENTS

| | | |
|---|---|---|
| JP | 62-283497 | 12/1987 |

\* cited by examiner

POWER MANAGEMENT BLOCK FOR USE IN A NON-VOLATILE MEMORY SYSTEM

CROSS REFERENCE TO RELATED APPLICATIONS

This application claims priority to U.S. Provisional Patent Application No. 60/422,166, filed Oct. 28, 2002, which is hereby incorporated by reference in its entirety.

The present invention is related to co-pending U.S. patent application Ser. Nos. 10/281,739, 10/281,823, 10/281,670, 10/281,824, 10/281,631, 10/281,855, 10/281,762, 10/281,696, 10/281,626, and 10/281,804, as well as co-pending U.S. Provisional Patent Application Nos. 60/421,910, 60/421,725, 60/421,965, 60/421,746, and 60/421,911, each filed on Oct. 28, 2002, which are each incorporated herein by reference in their entireties.

BACKGROUND OF THE INVENTION

1. Field of Invention

The present invention relates generally to mass digital data storage systems. More particularly, the present invention relates to systems and methods for efficiently enabling a determination to be made regarding whether a memory system that is being powered on was previously powered down normally or abnormally.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller components. Typically, a flash memory chip set may be arranged to be assembled into an embedded system. The manufacturers of such assemblies or host systems typically acquire flash memory in component-form, as well as other components, then assemble the flash memory and the other components into a host system.

When a memory system is powered down, the power down may either occur because a user has shut down the memory system, or because there has been a loss of power to the memory system. If a user chooses to power down the memory system, the memory system generally completes substantially all current processes, e.g., the memory system completes a process of writing a file from a host system into a directory associated with the memory system. If a power down occurs because of an unexpected or abrupt loss of power due to a power failure, for example, then current processes are not completed and are instead typically aborted.

A memory system which has been powered down under "normal" circumstances, as for example in response to a user request to cut power to the memory system, generally does not require a disk scan or data recovery to be performed, as all processes which were occurring at the time a power down request was received have been completed. This is typically referred to as a "normal shutdown" or "normal power down." However, a memory system which has been powered down under "abnormal" circumstances, e.g., due to a power failure, battery failure or accident power removal, typically requires a disk scan and a data recovery to be performed, as will be appreciated by those skilled in the art. The power down under abnormal circumstances is typically referred to as an "abnormal shutdown" or an "abnormal power down."

In a conventional flash non-volatile memory system, it is generally not possible for the memory system to determine whether a power down has occurred because of an intended, e.g., user, shut down or because of a power failure. As a result, relatively time consuming recovery processes, for example, a "scandisk" process in the Windows/DOS environment, are typically applied each time the memory system is powered up whether it has been powered down normally or abnormally. While applying scandisk or similar processes when the memory system was previously shut down under abnormal circumstances enables data recovery to occur, applying the processes when the memory system was shut down under normal circumstances may be inefficient, as such recovery processes are effectively unnecessary.

Therefore, what is desired is a process and a system which enables a determination to be made when a memory system is powered up as to whether the memory system was previously shut down normally or abnormally. That is, what is needed is an efficient method for allowing data associated with a memory system which was shut down abnormally to be restored when the memory system is powered up, without causing the memory system to undergo processes associated with restoring the data when the memory system was shut down normally.

SUMMARY OF THE INVENTION

The present invention relates to a system and a method for enabling a power up process of a non-volatile memory to occur efficiently. According to one aspect of the present invention, a method for utilizing a memory system that has a non-volatile memory with at least one reserved memory area includes providing power to the memory system, initializing the non-volatile memory, and writing a first signature into the reserved memory area. The first signature is arranged to indicate that the memory system was successfully initialized. In one embodiment, the method also includes executing a power down process on the memory system, and writing a second signature into the reserved memory area which indicates that the power down process has been executed.

A reserved memory area such as a power management block which is arranged to contain initialization and power down signatures enables a determination to be efficiently made as to whether a previous removal of power from the non-volatile memory system was due to a requested power down or due to a power failure. When a power management block is accessed when a non-volatile memory system such as a NAND flash memory is powered up, the contents of the power management block may effectively be scanned or obtained to determine whether the most recent previous power down was requested or due to a power failure. For instance, when a power down signature is located, the indication is typically that the previous power down was requested. Hence, a memory or data recovery process is generally not needed. Alternatively, when a power down or shut down signature is not located but an initialization or power up signature is located, the indication is generally that the previous power down was due to a power failure. Accordingly, a data recovery process may be run. Running or executing a time-consuming data recovery process at power up substantially only when such a process is needed by a non-volatile memory, e.g., when a power failure has previously occurred, enables the non-volatile memory to be used more efficiently, as such a process may be avoided when there is effectively no data recovery needed.

According to another aspect of the present invention, a method for utilizing a memory system which has a non-volatile memory with a reserved memory area includes providing power to the memory system, determining when the memory system has previously undergone a substantially normal power down process, and performing a first process on the non-volatile memory when it is determined that the memory system has not previously undergone a normal power down process. The first process is typically arranged to ready the non-volatile memory for use. Finally, the method includes substantially enabling the non-volatile memory to be used when it is determined that the memory system has previously undergone a normal power down process.

In one embodiment, determining when the memory system has previously undergone the substantially normal power down process includes determining when the reserved memory area includes a first signature which indicates that a normal power down process has previously occurred. In such an embodiment, determining when the memory system has previously undergone the substantially normal power down process may also include determining when the reserved memory area includes a second signature that indicates that the memory system has previously undergone an initialization process. When it is determined that the reserved memory area does not include the second signature and does not include the first signature, the first process may be an initialization process. Alternatively, when it is determined that the reserved memory area includes the second signature and does not include the first signature, the first process may be a data recovery process.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation a memory device, e.g., memory device 120 of FIG. 1a.

DETAILED DESCRIPTION OF THE EMBODIMENTS

Figure 1A:
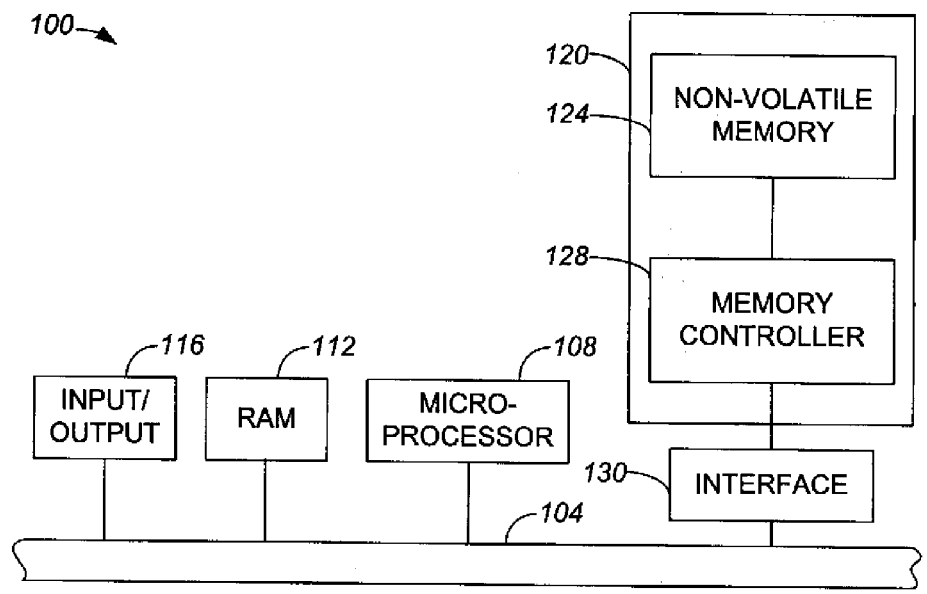
FIG. 1a is a diagrammatic representation of a general host system which includes a non-volatile memory.

The loss of power to a memory system may generally cause a multitude of problems within the memory system. The problems include, but are not limited to, data being lost when power is lost during a process of writing a file to the flash memory. In order to correct problems which occur due to a power loss, recovery operations may be performed upon a subsequent power up of a memory system to maintain data integrity. When a flash memory has experienced a loss of power while being written to, data may be incorrectly programmed into the memory. In the event that corrupted data is in a system area such as a file allocation table (FAT) or a directory, the flash memory may not be recognizable to a host. A successful recovery process would return the flash memory to a usable state. If a file is partially written, the portion that has not been written is typically considered to be non-existent. The portion that has been written may be salvaged into a temporary file for a user to review, discard, create, or merge into another file. Typically, without knowing the conditions associated with the last shut down, recovery operations may be performed each time the memory system is powered up, even when the operations are not necessary, as for example when a normal power down occurred the last time the memory system was shut down.

The ability to differentiate between a normal power down and an abnormal power down associated with a non-volatile memory component enables a power up process to occur more efficiently. For example, a relatively time consuming scandisk operation may be substantially avoided in the event that a previous power down of a memory component is determined to have been normal. If a previous power down is determined to have been abnormal, then a scandisk operation may be used to reclaim lost memory. By substantially preventing memory recovery processes such as scandisk processes from occurring unless such processes are needed, e.g., when there has been an abnormal power down such as a power failure, an overall power up process may occur more efficiently.

Maintaining initialization and power down signatures within a non-volatile memory system, as for example in a reserved section of non-volatile memory, enables a determination to be efficiently made as to whether a previous removal of power from the non-volatile memory system was due to a requested power down or due to a power failure. For example, any time a power down occurs under normal circumstances such as a requested power down, a power down signature which indicates that a power down occurred under normal circumstances may be stored. Hence, when such a power down signature is located during the next power up process, the power down signature may be used to determine that a previous power down occurred under normal circumstances and that a memory recovery process is not needed. In one embodiment, a reserved block, e.g., a power management block, of a memory component or chip may be arranged such that pages in the reserved block may be written into with a power down signature each time a normal power down occurs. When power is next applied to the memory component, the reserved block may be accessed to determine if a suitable power down signature is contained therein.

Flash memory systems or, more generally, non-volatile memory devices which may benefit from the use of a power management block generally include flash memory cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 1c. Referring to FIG. 1a, a general host system which includes a non-volatile memory device, e.g., a CompactFlash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 1b.

Non-volatile memory 124, e.g., flash memory such as NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and secure digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 1B:
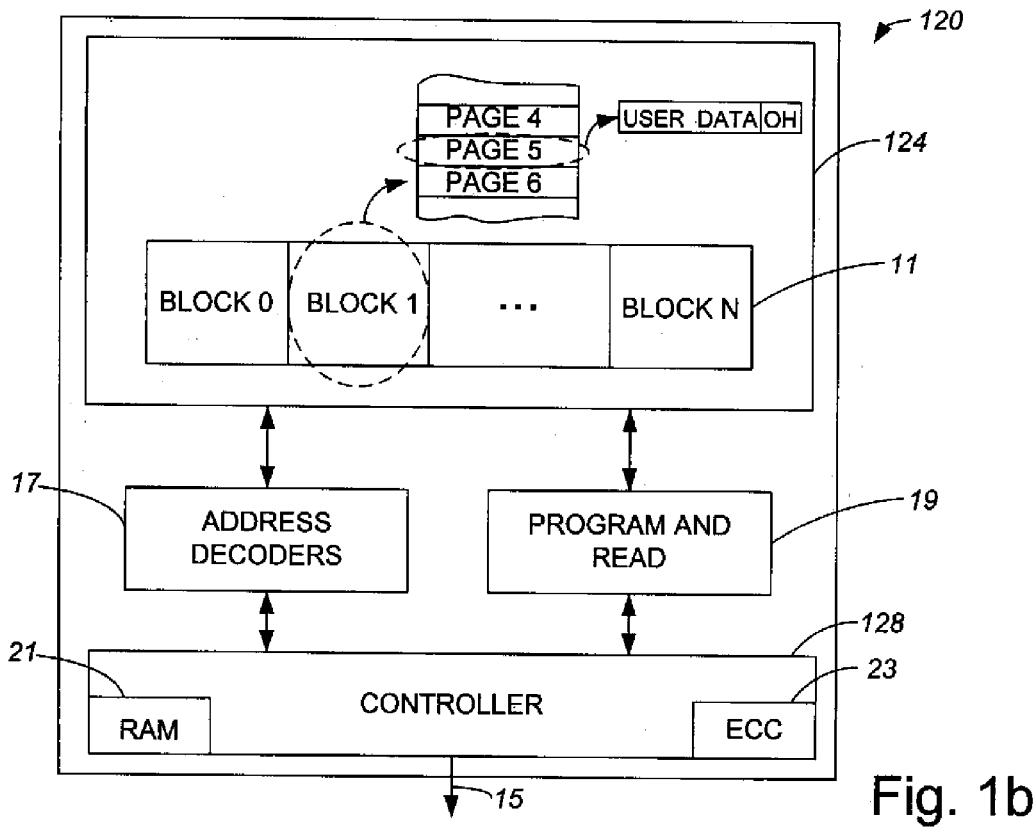

With reference to FIG. 1b, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 1a. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 apply the correct voltages to gate and bit lines of array 11 in order to program data to, read data from, or erase a group of memory cells being addressed by the control system 128. Additional circuits 19 include programming drivers that control voltages applied to elements of the array that depend upon the data being programmed into an addressed group of cells. Circuits 19 also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like.

Array 11 is divided into a large number of BLOCKS 0–N memory cells. As is common for flash EEPROM systems, the block is typically the smallest unit of erase. That is, each block contains the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 1b, one sector includes user data and overhead data. Overhead data typically includes an error correction code (ECC) that has been calculated from the user data of the sector. A portion 23 of the control system 128 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data, or redundant data, is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 1C:
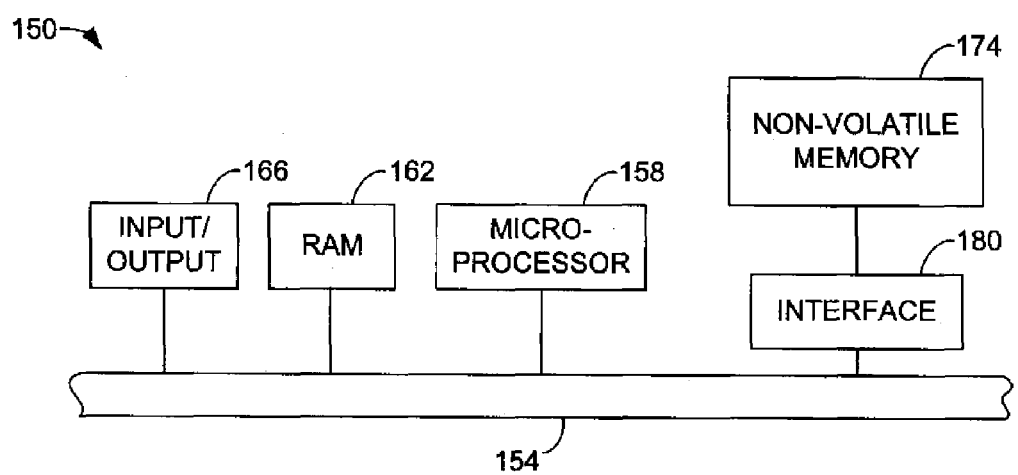
FIG. 1c is a diagrammatic representation of a host system which includes an embedded non-volatile memory.

In one embodiment, non-volatile memory is embedded into a system, e.g., a host system. FIG. 1c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices (not shown), i.e., software code devices or firmware code devices, which allow non-volatile memory 174 to be controlled. Such code devices, which may be a flash memory packaged with CPU inside microprocessor 158, a separate flash ROM, or inside non-volatile memory 174, which will be described below, may enable physical blocks in non-volatile memory 174 to be addressed, and may enable information to be stored into, read from, and erased from the physical blocks.

Figure 2:
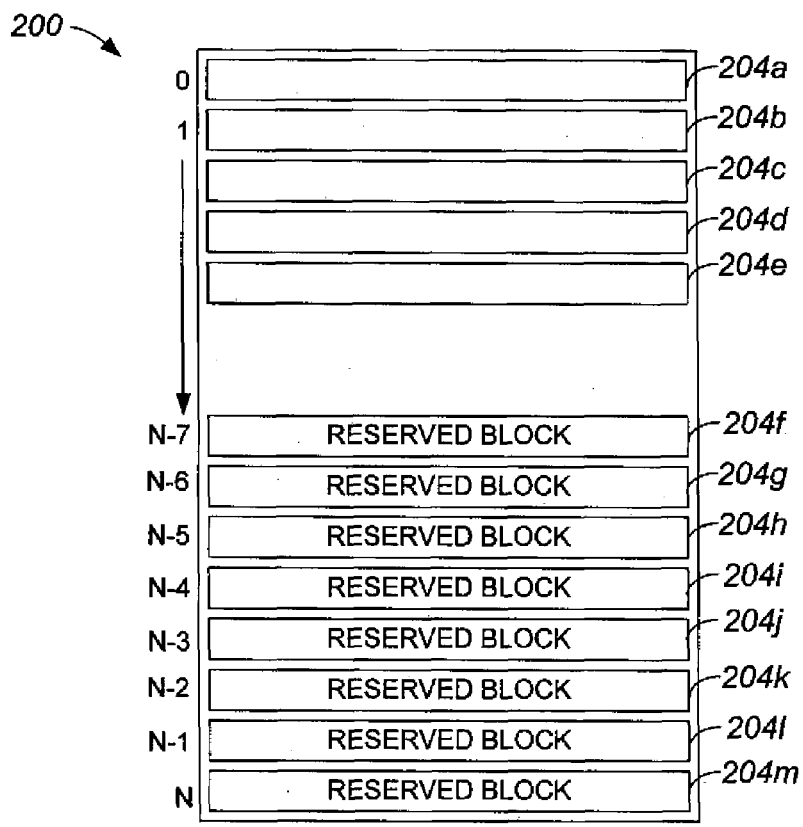
FIG. 2 is a diagrammatic representation of a non-volatile memory component in accordance with an embodiment of the present invention.

In general, a non-volatile memory component such as a NAND flash memory chip is divided into blocks. FIG. 2 is a diagrammatic representation of a non-volatile memory component in accordance with an embodiment of the present invention. A memory component 200 includes a plurality of blocks 204. The number of blocks 204 within memory component 200 may vary widely depending upon the overall size of memory component 200. By way of example, memory component 200 may include 512 blocks, 1024 blocks, 2048 blocks, or 4096 blocks. It should be appreciated that memory component 200 may generally include N blocks 204, where N may be substantially any suitable number of blocks.

A certain number of blocks 204 within memory component 200 may be considered to be reserved blocks 204f–m. Although reserved blocks 204f–m may be the last few usable blocks 204, as for example the last eight blocks 204, in memory component 200, reserved blocks 204f–m may generally be any blocks 204 within memory component 200. Reserved blocks 204f–m are typically reserved for use as power management blocks or erase count blocks, which are described in co-pending U.S. patent application Ser. No. 10/281,804, which has been incorporated by reference. Often, reserved blocks 204f–m may include a current power management block which may be replaced or superseded by another power management block allocated from reserved blocks 204f–m once the current power management block is full.

Figure 3A:
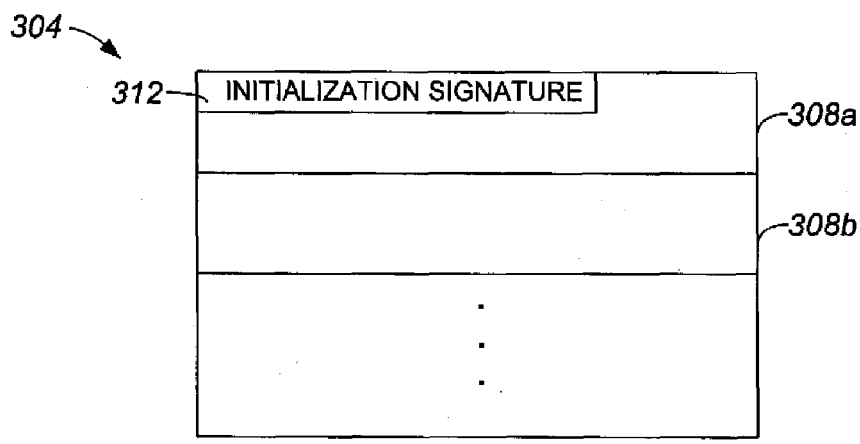
FIG. 3a is a diagrammatic representation of a power management block which includes an initialization signature in accordance with an embodiment of the present invention.

When power is applied to memory component 200, e.g., when power is first applied as a part of an initialization process, an initialization signature, or bits which are arranged to indicate that an initialization process was successful, may be stored into a page associated with a power management block. With reference to FIG. 3a, one embodiment of a power management block which includes an initialization signature will be described in accordance with an embodiment of the present invention. A power management block 304 generally includes any number of pages 308. Typically, the number of pages 308 included in power management block 304 may be dependent at least in part upon the standard size of a block within an overall non-volatile memory which include power management block 304.

Once a memory component is successfully initialized, an initialization or "open" signature 312 may be written into a first page 308a of power management block 304. As such, when initialization signature 312 is found in first page 308 or, more generally, is the most recent signature available in power management block 304, the indication is that an initialization process has been successful. In one embodiment, initialization signature 312 maybe written into page 308*a* along with other information, e.g., an average erase count.

Figure 3B:
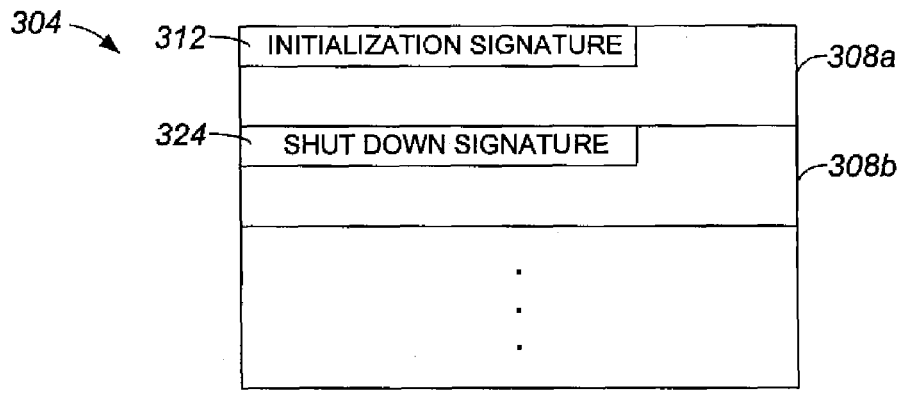
FIG. 3b is a diagrammatic representation of a power management block, e.g., power management block 304 of FIG. 3a, with an initialization signature and a shut down signature in accordance with an embodiment of the present invention.

When the memory component which includes power management block 304 is powered up, the last page 308 in which contents have been written is typically accessed. The last page 308 in which contents have been written may include initialization signature 312 if a previous initialization process was successful, but a shut down process which occurred after the initialization process was abnormal. If the shut down process which occurred after the initialization process was normal, then the last page 308 in which contents have been written will typically include a shut down signature, as shown in FIG. 3*b*. A shut down or "closed" signature 324 may generally include bits which are arranged, as for example in a pattern, to indicate that a shut down process was successfully completed. In general, the presence of shut down signature 324 in the last page 308*b* in which contents have been written indicates that the most recent power down of a memory component occurred under normal circumstances, and not under abnormal circumstances such as an abrupt loss of power due to a battery failure which may make it necessary to perform a data recovery process.

When shut down signature 324 is written into page 308*b*, shut down signature 324 may be written into page 308*b* along with other information. Other information that may be written into page 308*b* along with shut down signature 324 may include, but is not limited to, an average erase count as well as erase counts pertaining to spare blocks such as most frequently erased blocks and least frequently erased blocks.

Figure 4:
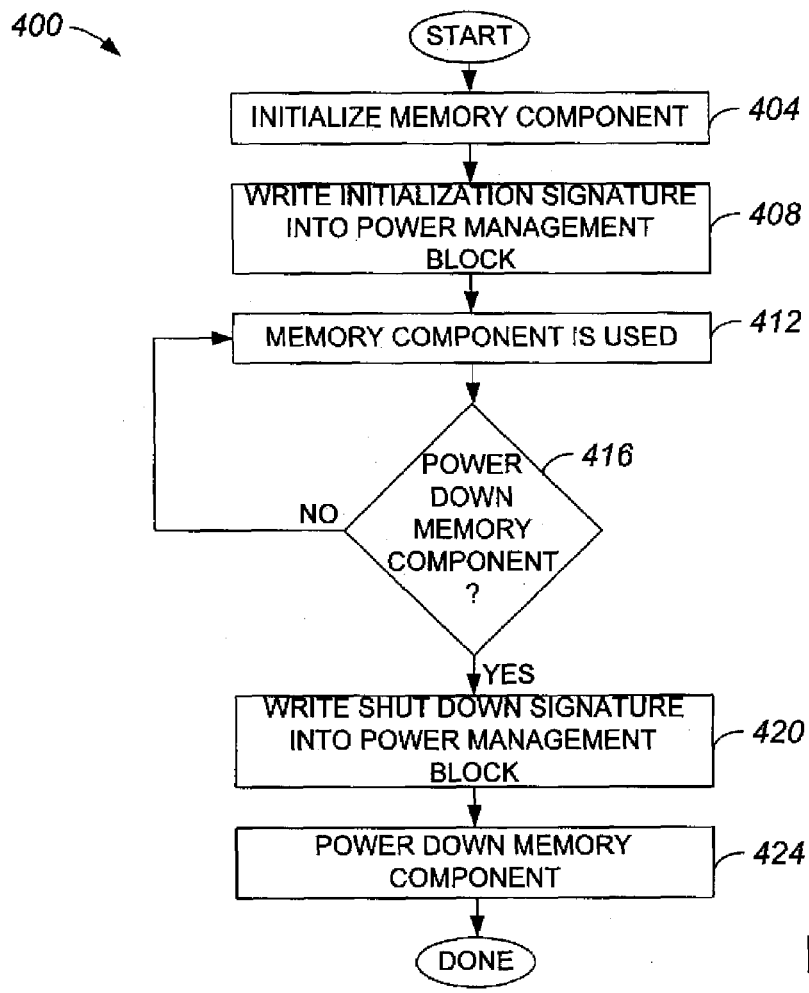
FIG. 4 is a process flow diagram which illustrates the steps associated with initially using a non-volatile memory component in accordance with an embodiment of the present invention.

With reference to FIG. 4, the steps associated with method of initially using a non-volatile memory component which has an associated power management block will be described in accordance with an embodiment of the present invention. A process 400 of initially using a non-volatile memory component, as for example the first time the memory component is powered up, begins at step 404 in which the memory component is initialized. Initializing the memory component may include, but is not limited to, providing power to the memory component, and creating data structures which are needed to enable the memory component to be used.

Once the memory component is initialized, an initialization signature may be written into the power management block in step 408. As previously mentioned, the initialization signature may be written into the same page of the power management block as an average erase count and other information. After the initialization signature is written, the memory component may be used in step 412. Using the memory component may generally include writing or storing data onto the memory component, as well as reading stored data from the memory component.

At some point in time, a user of the memory component may issue a command or a request to power down the memory component, as for example when the user wishes to power down a host device which is interfacing with the memory component. As such, a determination is made in step 416 regarding whether the memory component is to be powered down. If it is determined that the memory component is not to be powered down, then process flow returns to step 412 in which the memory component continues to be used. Alternatively, if the determination is that the memory component is to be powered down, then a shut down signature is written into the power management block in step 420. In one embodiment, the shut down signature is written at substantially the same time that other information is stored into the same page as the shut down signature. Such information may include, but is not limited to, an average erase count, an identifier associated with a least frequently erased block table, and an identifier associated with a most frequently erased block table, as mentioned above. After the shut down signature is written into the power management block, the memory component is powered down in step 424, and the process of initially using a memory component is completed.

Figure 5:
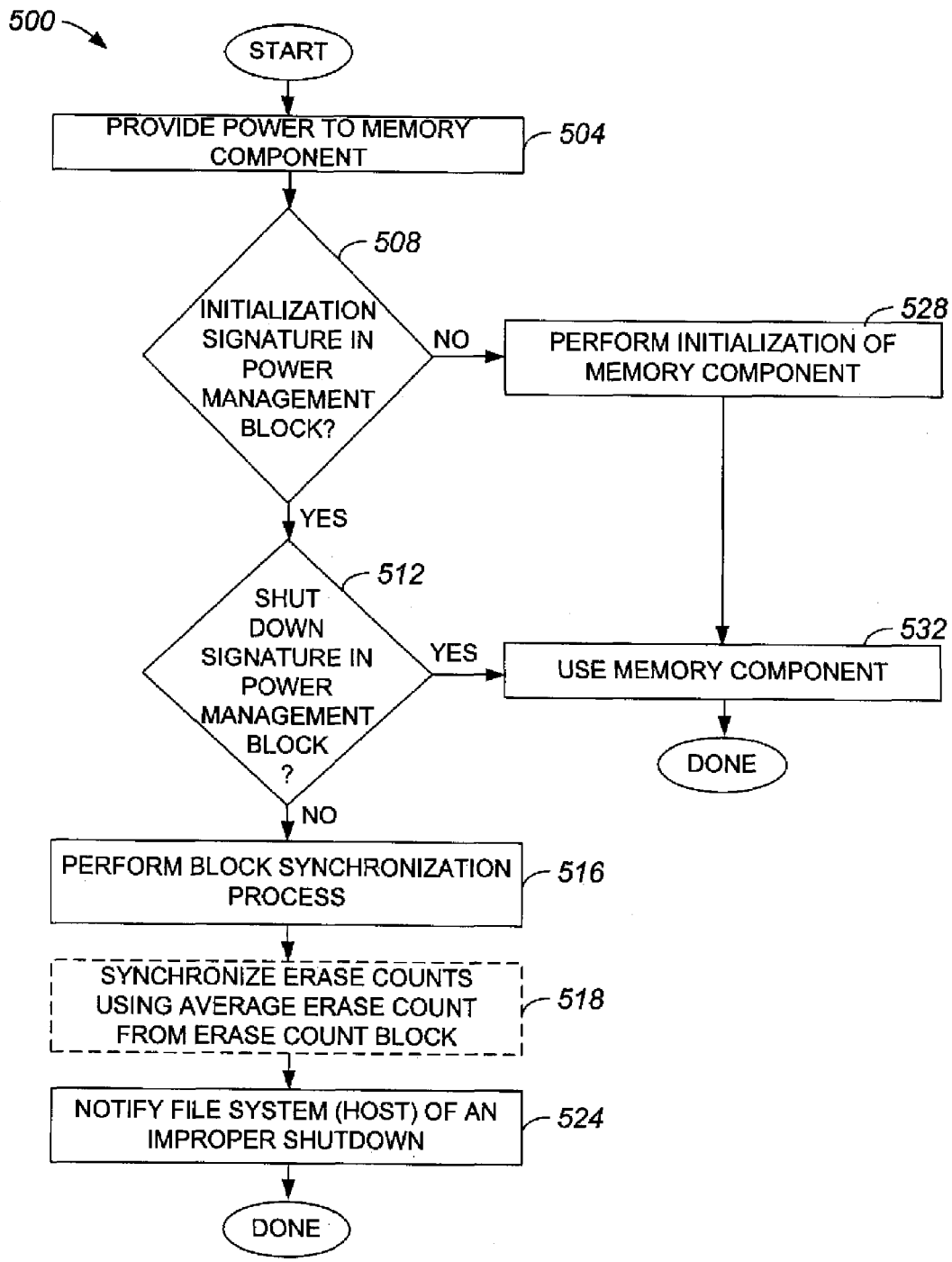
FIG. 5 is a process flow diagram which illustrates the steps associated with a method of utilizing a memory component that may previously have been powered down in accordance with an embodiment of the present invention.

In general, when it is not known whether a memory component is to be initialized, a power management block of the memory component may be checked for an initialization signature. That is, rather than automatically initializing a memory component, as may occur when it is known that power is being provided to a memory component for the first time, it may first be determined if the memory component has previously been initialized and, as a result, powered up and powered down. FIG. 5 is a process flow diagram which illustrates the steps associated with a method of utilizing a memory component that may previously have been powered down in accordance with an embodiment of the present invention. A process 500 of utilizing a memory component which includes a power management block begins at step 504 in which power is provided to the memory component. Once power is provided to the memory component, it is determined in step 508 whether there is an initialization signature in the power management block. Specifically, it is determined whether an initialization of the memory component was previously completed.

When it is determined that there is an appropriate initialization signature in the power management block, then the indication is that an initialization or a power up of the memory component was previously successfully completed. Accordingly, in step 512, it is determined if there is an appropriate shut down signature in the power management block. When there is an appropriate shut down signature in the power management block, the indication is that a shut down signature is the most recent signature in the power management block. In one embodiment, the determination of whether there is an appropriate shut down signature includes determining if an initialization signature is the most recent signature in the power management block, or is present in the most recently written page in the power management block.

If the determination in step 512 is that there is an appropriate shut down signature in the power management block, then the indication is that data with the memory component is substantially synchronized and, hence, a data recovery process is not needed. Accordingly, the memory component may be used in step 532. It should be appreciated that using the memory component may include writing an initialization or open signature into the power management block. Using the memory component may also include writing a shut down signature into the power management block when a shut down or power down command is received. Once the memory component is used in step 532, the process of utilizing a memory component is completed.

Alternatively, if it is determined in step 512 that a shut down signature is not the most recent signature in the power management block, then the indication is that an abnormal shut down of the memory component has previously occurred. That is, when an initialization signature is the most recent signature in the power management block and there is no shut down signature which corresponds to the initialization signature, then the implication is that the previous shut down of the memory component, or removal of power from the memory component, did not occur under normal circumstances. For example, power to the memory component may have been lost due to a battery failure. Accordingly, process flow moves from step 512 to step 516 in which a block synchronization process is performed. Typically, a block synchronization process may be performed since data associated with the memory component may not be synchronized, e.g., there may be more than one physical block assigned to a logical block. Furthermore, the host system may be notified that a previous shut down of the overall system which uses the memory component was not smooth, and may prompt a user to run a recovery diagnostic such as a scandisk diagnostic.

In one embodiment, after a data recovery process is performed, substantially all erase counts associated with blocks may be synchronized or otherwise updated in step 518 using an average erase count obtained from an erase count block. One example of an erase count block is described co-pending U.S. patent application Ser. No. 10/281,626, which has been incorporated by reference.

After the erase counts are synchronized, the operating system or the host is notified that an improper shut down or power failure has occurred in the previous power down in step 524. That is, a file system of the host associated with the memory component may be notified of an improper shut down. The host will typically determine whether a data integrity check and recovery process like a "scandisk" process may be required. A query of whether such a process may be needed may be prompted to a user. It may then be left up to the user whether to start a recovery process or to ignore the notification.

Returning to step 508, if it is determined that there is no initialization signature in the power management block, then the indication is that the memory component has not previously been successfully initialized. Accordingly, in step 528, the memory component is initialized. Initializing the memory component may include writing an initialization signature into the power management block if the memory component is properly initialized. Once the memory component is initialized, then the memory component may be used in step 532.

In general, when a power failure occurs within an overall system, data integrity associated with files may be compromised. Specifically, the data integrity of files which are effectively written into a data area of a non-volatile memory or a memory component from a host may be compromised when the writing process is prematurely aborted due to a power failure. When there is a power down request from a user, the writing of files is typically completed before an actual power down occurs.

Figure 6:
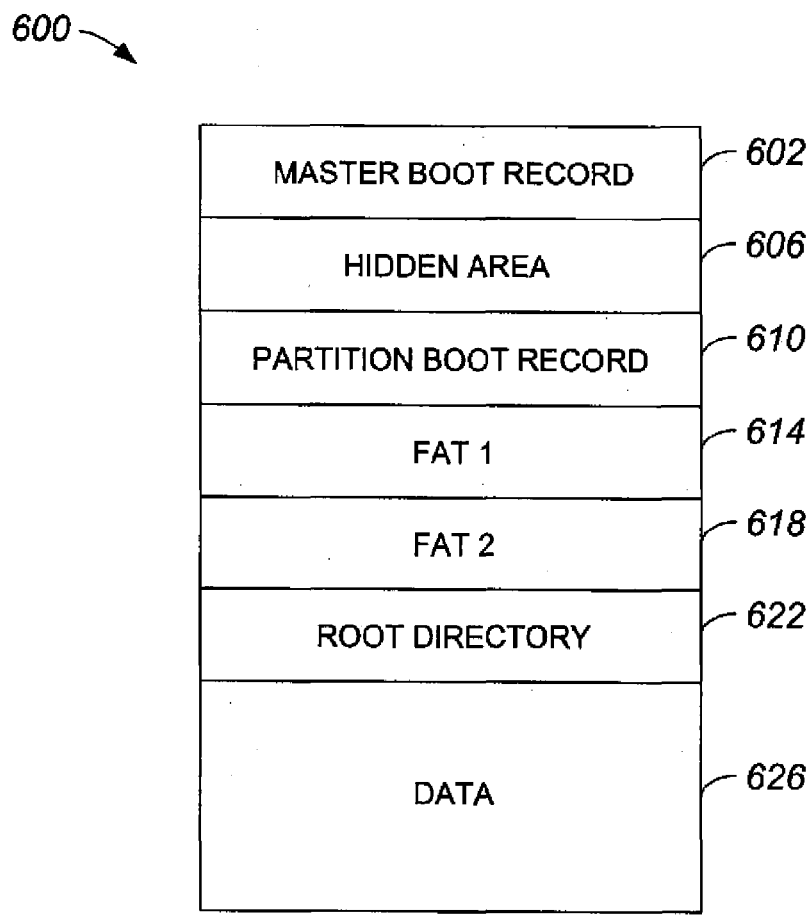
FIG. 6 is a diagrammatic representation of a host system area and a data area of a non-volatile memory in accordance with an embodiment of the present invention.

When files are written into a non-volatile memory, different areas of the non-volatile memory are typically written into based on a sequence. For instance, a host system area and a data area of the non-volatile memory may be written into in a particular order. FIG. 6 is a diagrammatic representation of a host system area and a data area of a non-volatile memory in accordance with an embodiment of the present invention. In the described embodiment, a non-volatile memory 600 is a NAND memory, although it should be appreciated that non-volatile memory 600 may generally be any suitable memory.

A host system area of memory 600 generally includes a master boot record 602, a hidden area 606, a partition boot record 610, a first file allocation table 614, a second file allocation table 618, and a root directory 622. Master boot record 602 enables it to be determined which partitions associated with memory 600 are compatible with which operating systems. For example, master boot record 602 may specify that a particular partition is compatible with a Linux operating system, while another partition is compatible with a Windows 98 operating system. Partition boot record 610, as will be appreciated by those skilled in the art, enables a host system which interfaces with memory 600 to identify operating systems with which memory 600 is compatible.

A data area 626 of memory 600 is arranged to contain subdirectories (not shown) associated with root directory 622. In addition, data area 626 is arranged to contain the contents of files associated with memory 600. When a file is to be written into memory 600, as will be described below with reference to FIG. 7, a directory, e.g., root directory 622 or a subdirectory associated with root directory 622, may be written into with a file name, after which data associated with the file may be written into data area 626. File allocation tables 614, 618 may then be written into, and the directory in which the file name has been written may be updated with the location of the content, the size, and the time of creation of the file.

Figure 7:
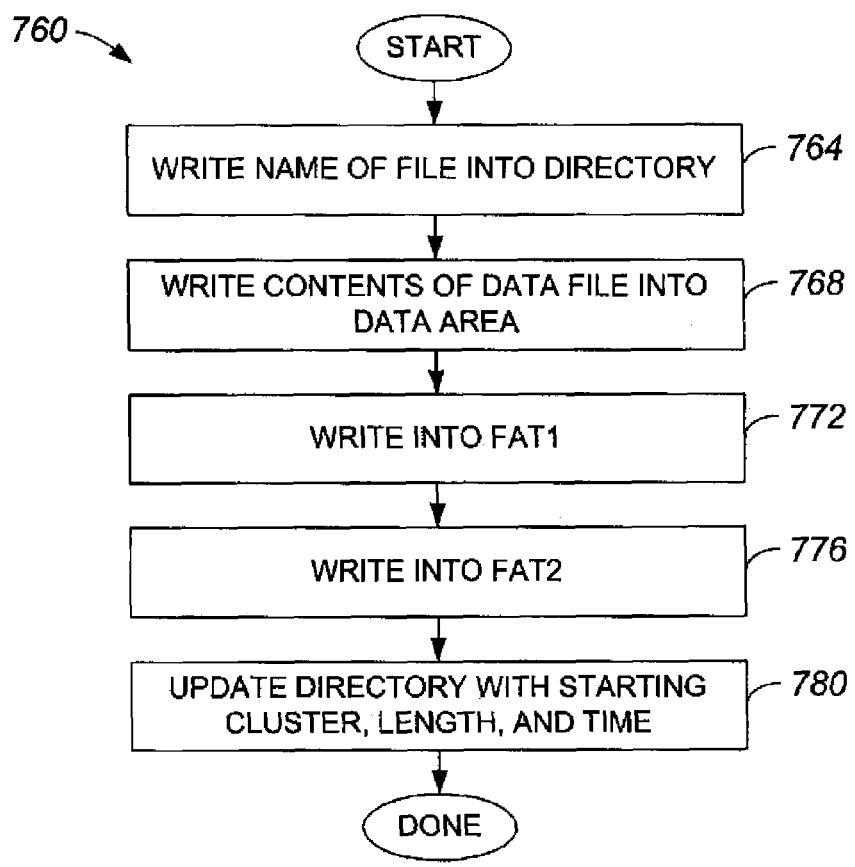
FIG. 7 is a process flow diagram which illustrates the steps associated with writing a file associated with a host system using a file allocation table file system such as Windows or DOS onto a non-volatile memory in accordance with an embodiment of the present invention.

With reference to FIG. 7, an example of typical steps associated with one method of writing a file associated with a host system onto a non-volatile memory will be described in accordance with an embodiment of the present invention. A process 760 of writing a file begins at step 764 in which the name of a data file that is to be created, creating time and attribute are written into a directory of the associated with the non-volatile memory, as for example a NAND memory. Once the name of the file is written into the directory, the contents of the data file are written into a data area associated with the memory in step 768. In the described embodiment, after contents of the data file are written into a data area, a first FAT may be written in step 772 to enable the location of data in the data area which corresponds to the file to be identified. A second FAT may be written in step 776 such that the second FAT is effectively a copy of the first FAT. After both FATs are written, the directory entry which corresponds to the file may be updated in step 780 with a starting cluster which identifies where in the data area the contents of the file begin, a length of the file, and a final time which identifies when the file was effectively created. Since the file creation or modification is not completed until the step 780 is performed, the last cluster, or the last page of the content of the data file, is typically written after step 772 and step 776. As will be appreciated by those skilled in the art, a cluster may include any number of pages, and is typically defined by a partition boot record. The process of writing a file is completed once the directory entry is updated.

Through the use of a power management block, it may be ascertained whether a previous removal of power from a memory was due to a power failure or was otherwise abnormal. When it is determined that a power down of the memory was abnormal, then a file writing process may have been prematurely aborted. As such, it may be desirable to notify the host to perform a data recovery process to maintain the data integrity of the system.

With continued reference to FIG. 7, if power is shut down before step 764 or after the step 780, the file is not written or is completed written, there is no corrupted file. Those files, which are to be written but are not written since power is lost before a write process started, will not be available to the user. With the exception of step 768, if a write operation is started but is not completed in either step 764, step 772, step 776 or step 780, to the steps are effectively not performed. Hence, the page that was being written to is essentially discarded, and the old page is used for the recovery. The old pages are available in the present invention. The old pages which substantially replace corrupted pages are transparent to the host. The validity of the content is protected by ECC checking. When a page is corrupted, the previous "good" or uncorrupted page may be returned to the host, as described in co-pending U.S. Provisional Patent Application No. 60/421,725, which has been incorporated by reference in its entirety. The updated information of a page is substantially always written into an erased page without overwriting an old page. Therefore, if the old page has not been erased, its data content will not be corrupted by new information in the middle of overwrite. Furthermore, as described in co-pending U.S. patent application Ser. No. 10/281,631, the critical area of the file system, including the FAT and directory, are often split into multiple of physical blocks. After the flash memory is formatted, there is typically a valid copy of each page of the FAT and root directory. A backup page is available when the new page is not written successfully, thereby enabling the media to be recoverable, as an un-recognizable FAT and directory may make the media un-recoverable.

If a power failure occurs at step 764 and causes the write operation to fail, the previous copy of the directory is generally used. If the write operation completes successfully, the system may have a file with name, but include no contents, i.e., have a file size of approximately zero. As such, a user will typically need to "re-create" the file such that the file will be stored with contents. When a loss of power occurs either somewhere in the middle of step 768 or after step 768, but before 772, the data that is written is not associated with any file and, hence, is not available to user. The user will typically have a file with size of approximately zero. If a loss of power occurs after either FAT1 or FAT2 is written, the host may be able to locate the data and make it available to the user to salvage some of the information during a recovery process. It should be understood that a power failure after step 768 because the information written in that failure is generally not salvageable using a normal recovery process. Since the directory entry does not associate the file to the data until step 780, the user will still "see" the file size as being approximately zero even after step 776.

The present invention allows a user to notify a host that a power failure has occurred, and that a recovery process is generally needed. When a memory is powered up after an abnormal power down, block copying or merging processes may also need to be completed in the aftermath of an abnormal power down. For example, when a plurality of physical blocks is associated with a single logical block, it may be desirable to resolve the physical blocks such that the logical block is substantially only associated with a single physical block which contains substantially all current data or information associated with the logical block.

Resolving physical blocks which are associated with a common logical block typically includes determining which of the physical blocks was more recently associated with the logical block. Update indexes, which are described in co-pending U.S. patent application Ser. No. 10/281,762, may be used to determine which of a plurality of physical blocks is more recently associated with a logical block and, hence, should effectively be updated to contain the most recent contents associated with the logical block. Often, when a logical block has more than one associated physical block and it is essentially necessary to identify one physical block to be associated with the logical block, the update indexes may be obtained form the physical blocks, as update indexes are arranged such that a comparison of update indexes from two physical blocks will identify which of the two physical blocks should remain associated with the logical block after the physical blocks are resolved, e.g., after a merge process occurs, and which of the two physical blocks should be disassociated from the logical block.

An update index, which may be stored in at least one overhead or redundant area associated with a physical block, may be arranged to indicate which of two physical blocks involved in a copying, or a merging, is an old physical block and which of the two physical blocks is the new physical block, or the physical block into which contents are being copied. For example, the update index of the new physical block may be set such that the value of that update index is higher than the update index of the old physical block. Hence, when the update indexes of the physical blocks are checked to determine which physical block is the new physical block, it may be determined that the physical block with the higher update index is the new physical block.

Figure 8:
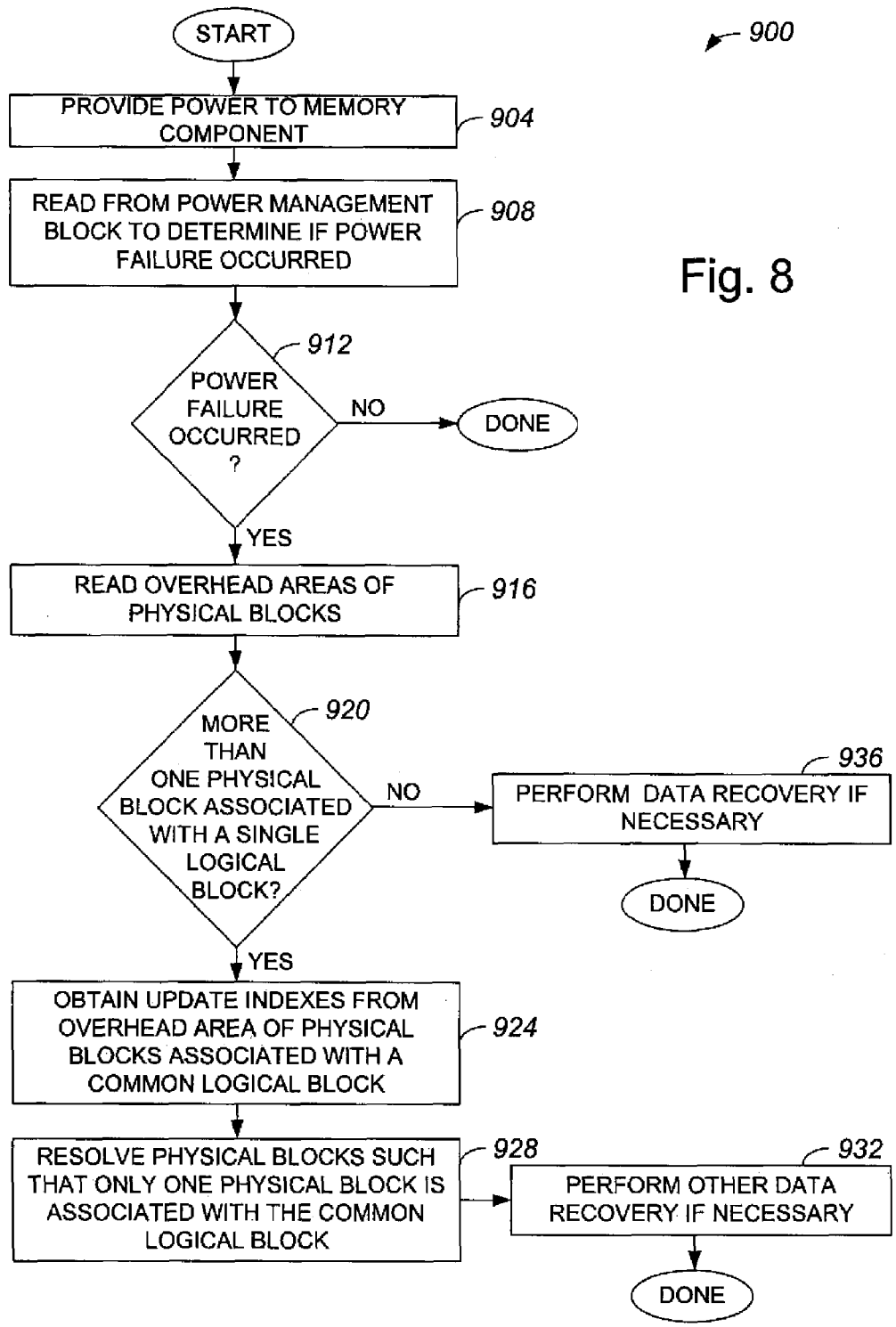
FIG. 8 is a process flow diagram which illustrates the steps associated with one method of identifying and processing physical blocks which are associated with a single logical block in accordance with an embodiment of the present invention.

When it is determined, as for example using a power management block, that a power failure has previously occurred within a memory system which includes non-volatile memory, then any logical block which has more than one associated physical block may be identified such that the physical blocks may be resolved, e.g., through the use of update indexes. In one embodiment, substantially the only logical block that may have more than one associated physical block is the last logical block which was in the process of being written or updated when the power failure occurred. FIG. 8 is a process flow diagram which illustrates the steps associated with one method of identifying and processing physical blocks which are associated with a single logical block in accordance with an embodiment of the present invention. A process 900 begins at step 904 in which power is provided to a memory component at some time after power to the memory component was removed, either due to an intentional power down or an unexpected power failure. After power is provided to the memory component, pages in a power management block of the memory component may be read to determine if a power failure occurred. As discussed above, when a shut down signature is effectively the most recent signature in the power management block, then the indication is that a previous shut down of the memory component was an intentional power down. Otherwise, the indication is typically that a previous shut down of the memory component was due to a power failure.

A determination is made in step 912 regarding whether a power failure occurred. If it is determined that a power failure did not occur, then the indication may be that there are no physical blocks to be resolved to a single logical block. As such, the process of identifying and resolving physical blocks is completed. Alternatively, if it is determined in step 912 that a power failure or an abnormal shut down has occurred, then there may be physical blocks to resolve. Hence, from step 912, process flow moves to step 916 in which the overhead areas of physical blocks associated with the memory component are read. Reading the overhead areas may include reading update indexes which are generally stored in the overhead areas, as well as reading information which pertains to the logical block with which each physical block is associated.

Once the overhead areas of the physical blocks of the memory component are read, it is determined whether any logical blocks have more than one associated physical block in step 920. If it is determined that there are logical blocks which have more than one associated physical block, the process flow moves to step 924 in which update indexes are obtained from the overhead area of physical blocks which are associated with a common logical block such that the update indexes of the physical blocks may be compared. It should be appreciated that when there are multiple logical blocks which have more than one associated physical block, the update indexes for physical blocks which are associated with one logical block may all be obtained. In other words, substantially all logical blocks which have more than one associated physical block may effectively be processed by obtaining the update indexes of substantially all physical blocks which are associated with such logical blocks.

After the update indexes are obtained from overhead areas of physical blocks, the physical blocks are resolved in step 928 such that each logical block has a single associated physical block. Physical blocks are generally resolved such that the update indexes of a plurality of physical blocks which are associated with a common logical block are used to identify which of the physical blocks is more recently associated with the common logical block. Resolving physical blocks may also include providing substantially all current information or data associated with the common logical block to the physical block that is more recently associated with the common logical block.

Upon resolving the physical blocks, other data recovery may be performed in step 932 if necessary. The other data recovery may include, for example, recovering clusters that were lost as a result of an aborted file copying process. Once data recovery is performed, the process of identifying and resolving physical blocks is completed.

Returning to step 920, if it is determined that there are no logical blocks which have more than one associated physical block, then the indication is that there are no physical blocks which are to be resolved. As such, process flow moves to step 936 in which other data recovery may be performed as necessary. When any other needed data recovery is performed, the process of identifying and resolving physical blocks is completed.

Figure 9:
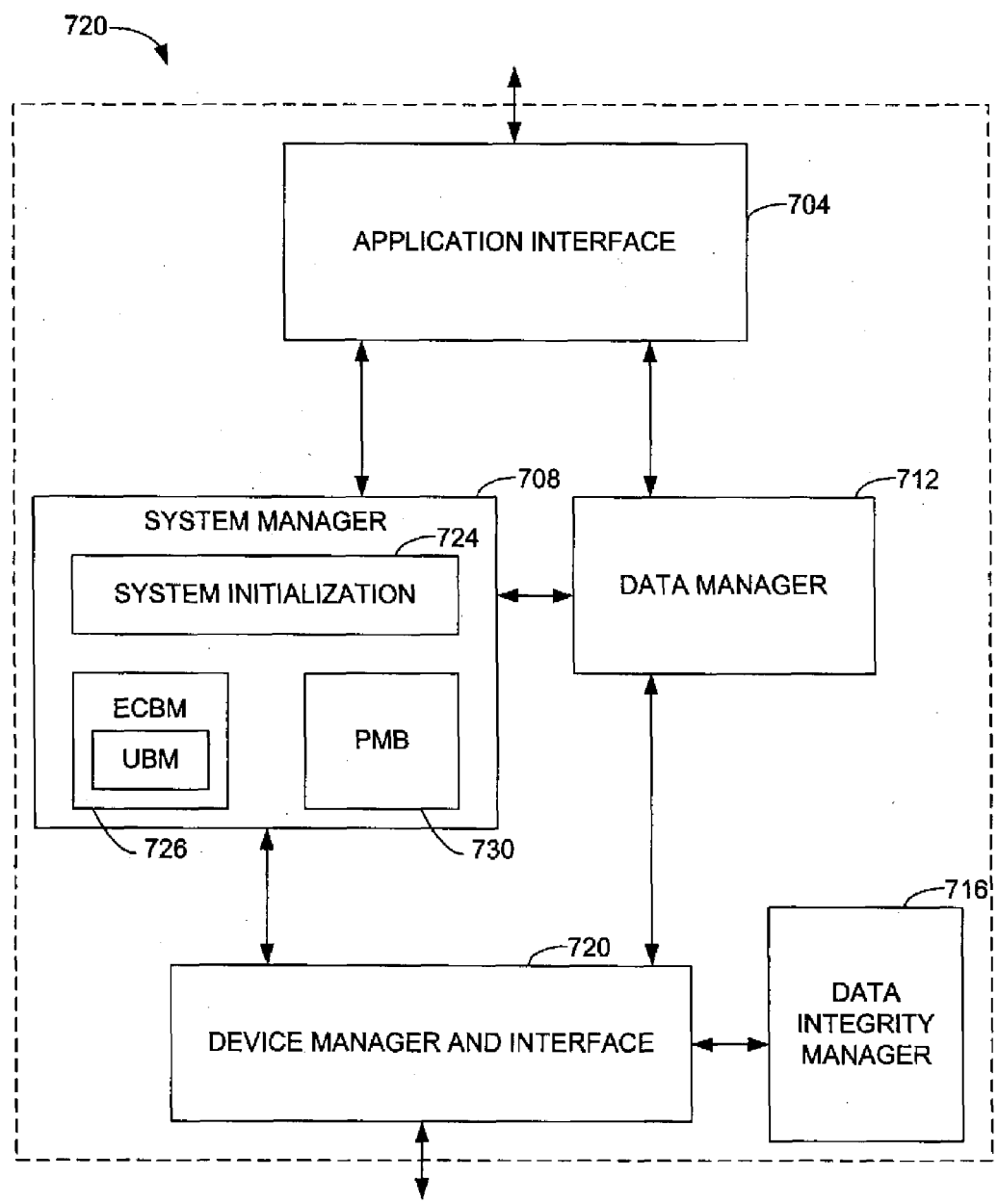
FIG. 9 is a diagrammatic block diagram representation of a system architecture in accordance with an embodiment of the present invention.

In general, the functionality associated with implementing, maintaining, and utilizing a power management block is provided in software, e.g., as program code devices, or as firmware to a host system which includes a non-volatile memory or non-volatile memory component. One embodiment of a suitable system architecture associated with the software or firmware provided to a host system to enable a power management block to be implemented, maintained, and used is shown in FIG. 9. A system architecture 700 generally includes a variety of modules which may include, but are not limited to, an application interface module 704, a system manager module 708, a data manager module 712, a data integrity manager 716, and a device manager and interface module 720. In general, system architecture 700 may be implemented using software code devices or firmware which may be accessed by a processor, e.g., processor 108 of FIG. 1a.

In general, application interface module 704 may be arranged to communicate with the host, operating system or the user directly. Application interface module 704 is also in communication with system manager module 708 and data manager module 712. When the user want to read, write or format the flash memory, it send requests to the operating system, the requests are passed to the Application interface. The Application interface directs the requests to the system manager module 708 or data manager module 712 depending on the requests.

System manager module 708 includes a system initialization submodule 724, an erase count block management submodule 726, and a power management block submodule 730. System initialization submodule 724 is generally arranged to enable an initialization request to be processed, and typically communicates with erase count block management submodule 726. Erase count block management submodule 726 includes functionality to cause erase counts of blocks to be stored, and functionality to cause an average erase count to be calculated, as well as updated, using individual erase counts. The use of erase counts is described in co-pending U.S. patent application Ser. No. 10/281,739, which has been incorporated by reference in its entirety. System initialization module 724 is also arranged to resolve a one-to-many logical-to-physical block assignment and, hence, may utilize update indexes. Power management block submodule 730 may be arranged to enable a power management to be implemented, maintained, and used. By way of example, power management block submodule 730 may be arranged to allocate power management blocks, and to oversee the writing of signatures and other information which may be stored in a power management block.

In addition to being in communication with application interface module 704, system manager module 708 is also in communication with data manager module 712, as well as device manager and interface module 720. Data manager module 712, which communicates with both system manager module 708 and application interface module 704, may include functionality to provide sector mapping which effectively translates logical sectors into physical sectors. That is, data manager module 712 is arranged to map logical blocks into physical blocks. Data manager module 712 may also include functionality associated with operating system and file system interface layers, and enables groups within blocks to be managed, as described in co-pending U.S. patent application Ser. No. 10/281,855, which has been incorporated by reference in its entirety.

Device manager and interface module 720, which is in communication with system manager module 708, data manager 712, and data integrity manager 716, typically provides a flash memory interface, and includes functionality associated with hardware abstractions, e.g., an I/O interface. Data integrity manager module 716 provides ECC handling, among other functions.

Although only a few embodiments of the present invention have been described, it should be understood that the present invention may be embodied in many other specific forms without departing from the spirit or the scope of the present invention. By way of example, although a power management block has generally been described as being associated with a NAND memory, e.g., an MLC NAND memory. In general, however, a power management block may be implemented with respect to substantially any suitable memory or memory system.

The number of bits included in an initialization signature and a shut down signature may vary widely. In one embodiment, the number of bits included in a signature may be dependent upon the requirements of a particular system. For instance, the number of bits included in a signature may be as few as one, or as many as the number of bits included in a page of a power management block.

The steps associated with the various methods of the present invention may be widely varied. In general, steps may be added, removed, reordered, and altered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for utilizing a memory system, the memory system including a non-volatile memory, the non-volatile memory including at least one reserved memory area, the method comprising:
   providing power to the memory system;
   determining when the memory system has previously undergone a substantially normal power down process;
   performing a first process on the non-volatile memory when it is determined that the memory system has not previously undergone a normal power down process, the first process being arranged to ready the non-volatile memory for use; and
   substantially enabling the non-volatile memory to be used when it is determined that the memory system has previously undergone a normal power down process.

2. The method of claim 1 wherein substantially enabling the non-volatile memory to be used includes writing a first signature into the at least one reserved memory area to indicate that the non-volatile memory is substantially enabled.

3. The method of claim 1 wherein determining when the memory system has previously undergone the substantially normal power down process includes:
   determining when the at least one reserved memory area includes a first signature, the first signature being arranged to indicate that the normal power down process has previously occurred.

4. The method of claim 3 wherein determining when the memory system has previously undergone the substantially normal power down process further includes:
   determining when the at least one reserved memory area includes a second signature, the second signature being arranged to indicate that the memory system has previously undergone an initialization process.

5. The method of claim 4 wherein when it is determined that the at least one reserved memory area does not include the second signature and does not include the first signature, the first process is the initialization process.

6. The method of claim 4 wherein when it is determined that the at least one reserved memory area includes the second signature and does not include the first signature, the first process is a data recovery process.

7. The method of claim 6 wherein the data recovery process is arranged to reclaim memory within the non-volatile memory.

8. The method of claim 7 wherein the data recovery process includes at least one of completing a file copying process and resolving physical blocks associated with the non-volatile memory.

9. The method of claim 1 wherein the first process is one of a data recovery process and a memory initialization process.

10. The method of claim 1 wherein the non-volatile memory is a NAND flash memory.

11. A memory system comprising:
   a non-volatile memory, the non-volatile memory including at least one reserved memory area;
   means for providing power to the memory system;
   means for determining when the memory system has previously undergone a substantially normal power down process;
   means for performing a first process on the non-volatile memory when it is determined that the memory system has not previously undergone a normal power down process, the first process being arranged to ready the non-volatile memory for use; and
   means for substantially enabling the non-volatile memory to be used when it is determined that the memory system has previously undergone a normal power down process.

12. The memory system of claim 11 wherein the means for substantially enabling the non-volatile memory to be used include means for writing a first signature into the at least one reserved memory area to indicate that the non-volatile memory is substantially enabled.

13. The memory system of claim 11 wherein the means for determining when the memory system has previously undergone the substantially normal power down process include:
   means for determining when the at least one reserved memory area includes a first signature, the first signature being arranged to indicate that the normal power down process has previously occurred.

14. The memory system of claim 13 wherein the means for determining when the memory system has previously undergone the substantially normal power down process further include:
   means for determining when the at least one reserved memory area includes a second signature, the second signature being arranged to indicate that the memory system has previously undergone an initialization process.

15. The memory system of claim 14 wherein when it is determined that the at least one reserved memory area does not include the second signature and does not include the first signature, the first process is the initialization process.

16. The memory system of claim 14 wherein when it is determined that the at least one reserved memory area includes the second signature and does not include the first signature, the first process is a data recovery process.

17. A memory system comprising:
   code devices that cause a determination of when the memory system has previously undergone a substantially normal power down process;
   code devices that are arranged to cause a first process to be performed on a non-volatile memory associated with the memory system when it is determined that the memory system has not previously undergone a normal power down process, wherein the first process is arranged to ready the non-volatile memory for use;
   code devices that are arranged to cause the non-volatile memory to be enabled for use when it is determined that the memory system has previously undergone a normal power down process; and
   a memory area that stores the code devices.

18. The memory system of claim 17 wherein the code devices that are arranged to cause the non-volatile memory to be enabled for use include code devices that are arranged to write a first signature into at least one reserved memory area of the non-volatile memory to indicate that the non-volatile memory is enabled for use.

19. The memory system of claim 17 wherein the code devices that cause the determination of when the memory system has previously undergone the substantially normal power down process include:

code devices that are arranged to cause a determination of when at least one reserved memory area of the non-volatile memory includes a first signature, the first signature being arranged to indicate that the normal power down process has previously occurred.

20. The memory system of claim 19 wherein the code devices that cause the determination of when the memory system has previously undergone the substantially normal power down process further include:

code devices that are arranged to cause a determination of when the at least one reserved memory area includes a second signature, the second signature being arranged to indicate that the memory system has previously undergone an initialization process.

21. The memory system of claim 20 wherein when it is determined that the at least one reserved memory area does not include the second signature and does not include the first signature, the first process is the initialization process.

22. The memory system of claim 20 wherein when it is determined that the at least one reserved memory area includes the second signature and does not include the first signature, the first process is a data recovery process.

23. A memory system comprising:

a non-volatile memory; and a control device, the control device being arranged to determine when the memory system has previously undergone a substantially normal power down process, to perform a first process on the non-volatile memory when it is determined that the memory system has not previously undergone a normal power down process wherein the first process is arranged to ready the non-volatile memory for use, and to substantially enable the non-volatile memory to be used when it is determined that the memory system has previously undergone a normal power down process.

24. The memory system of claim 23 wherein the first process is one of a data recovery process and a memory initialization process.

25. The system of claim 23 wherein the non-volatile memory is a NAND flash memory.

* * * * *